United States Patent
Qin et al.

(10) Patent No.: US 10,479,196 B2
(45) Date of Patent: Nov. 19, 2019

(54) TORQUE ELEMENT AND CAP ASSEMBLY INCLUDING THE SAME

(71) Applicant: Ford Global Technologies LLC, Dearborn, MI (US)

(72) Inventors: Charles Qin, Nanjing (CN); Le Hong, Nanjing (CN); Steven Shi, Nanjing (CN); Seven Qi, Nanjing (CN)

(73) Assignee: Ford Global Technologies LLC, Dearborn, MI (US)

(*) Notice: Subject to any disclaimer, the term of this patent is extended or adjusted under 35 U.S.C. 154(b) by 220 days.

(21) Appl. No.: 15/709,212

(22) Filed: Sep. 19, 2017

(65) Prior Publication Data

US 2018/0099560 A1    Apr. 12, 2018

(30) Foreign Application Priority Data

Oct. 12, 2016 (CN) .......................... 2016 1 0892545

(51) Int. Cl.
*B60K 15/04* (2006.01)

(52) U.S. Cl.
CPC .. *B60K 15/0406* (2013.01); *B60K 2015/0441* (2013.01); *B60K 2015/0451* (2013.01)

(58) Field of Classification Search
CPC ........ B60K 15/0406; B60K 2015/0451; B60K 2015/0441
See application file for complete search history.

(56) References Cited

U.S. PATENT DOCUMENTS

| | | | | |
|---|---|---|---|---|
| 4,676,390 A | * | 6/1987 | Harris ................ | B60K 15/0406 220/203.06 |
| 5,108,001 A | * | 4/1992 | Harris ................ | B60K 15/0406 220/203.06 |
| 5,904,057 A | * | 5/1999 | Abney, III ......... | B60K 15/0409 220/203.26 |
| 6,076,695 A | | 6/2000 | Palvoelgyi et al. | |
| 7,516,867 B2 | | 4/2009 | Hagano | |
| 7,624,889 B2 | | 12/2009 | Tharp et al. | |
| 8,561,826 B2 | | 10/2013 | Wang et al. | |
| 2006/0283860 A1 | | 12/2006 | Homma et al. | |

FOREIGN PATENT DOCUMENTS

JP      2000264079 A     9/2000

* cited by examiner

*Primary Examiner* — James N Smalley
(74) *Attorney, Agent, or Firm* — Geoffrey Brumbaugh; Kolitch Romano LLP

(57) ABSTRACT

The present disclosure provides a torque element to transmit torque between a first part and a second part of a cap assembly. The torque element includes a base having a first surface and a second surface opposite to the first surface; and an annular wall extending from the base in a direction away from the second surface. The first surface of the base includes at least one first ratchet and the annular wall includes at least one second ratchet on an outer side.

19 Claims, 6 Drawing Sheets

TORQUE ELEMENT AND CAP ASSEMBLY INCLUDING THE SAME

RELATED APPLICATION

This application claims the benefit of Chinese Patent Application No.: CN 201610892545.7 filed on Oct. 12, 2016, the entire contents thereof being incorporated herein by reference.

FIELD

The present disclosure relates to a torque element and a cap assembly for a container such as a fuel tank.

BACKGROUND

Generally, a fuel cap may include a click device to prevent the fuel cap from over tightening when a user is closing a fuel tank with the fuel cap. The click device will generate a click sound to alert the user if the fuel cap is further rotated by the user after the fuel cap is tightened. However, when opening the fuel cap, the user may not know that the fuel cap has been unlocked and the continued rotation may cause damage on the parts, especially for the fuel cap that is released by a half turn. U.S. Pat. No. 7,516,867B2 discloses a fuel cap having a torque element and a click device which are independent each other. However, the disclosed click device is complicated in its structure.

SUMMARY

According to one aspect of the present disclosure, a torque element is provided to transmit torque between a first part and a second part in a cap assembly. The torque element comprises a base having a first surface and a second surface opposite to the first surface; and an annular wall extending from the base in a direction away from the second surface. The first surface of the base includes at least one first ratchet and the annular wall includes at least one second ratchet on the outer side.

In one embodiment, the annular wall is substantially perpendicular to the second surface of the base.

In another embodiment, the base and the annular wall are integrally formed as one-piece In another embodiment, the first ratchet includes a first inclined surface and a first locking surface adjoined to the first inclined surface, and a first gradient of the first inclined surface relative to the first surface is smaller than a second gradient of the first locking surface relative to the first surface.

In another embodiment, the second ratchet includes a second inclined surface and a second locking surface adjoined to the second inclined surface, and a third gradient of the second inclined surface relative to a side surface of the annular wall is smaller than a fourth gradient of the second locking surface relative to the side surface of the annular wall.

In another embodiment, the first inclined surface and the second inclined surface face toward a counterclockwise rotation direction.

According to another aspect of the present disclosure, a cap assembly is provided. The cap assembly comprises a main body; a top cover mounted to the main body and having an outer surface and an inner surface opposite to the outer surface; and a torque element positioned between the main body and the top cover to transmit torque therebetween. The torque element includes a base having a first surface and a second surface opposite to the first surface; and an annular wall extending from the base in a direction away from the second surface. The first surface of the base includes at least one first ratchet, and the inner surface of the top cover includes at least one third ratchet cooperated with the first ratchet.

In one embodiment, an outer side of the annular wall of the torque element includes at least one second ratchet, the annular wall is adjacent to an inner wall of the main body, and the inner wall of the main body includes at least one fourth ratchet cooperated with the second ratchet.

In another embodiment, the at least one second ratchet and the at least one fourth ratchet are configured such that the top cover drives the torque element to rotate clockwise, and the torque element may rotate clockwise relative to the main body.

In another embodiment, when the main body rotates to a locked position or after the locked position, and a first predetermined torque value is exceeded, the at least one second ratchet slides over the at least one fourth ratchet.

In another embodiment, the at least one first ratchet and the at least one third ratchet are configured such that the top cover drives the torque element to rotate counterclockwise and the top cover may rotate counterclockwise relative to the torque element.

In another embodiment, when the main body rotates to an unlocked position or after the unlocked position, and a second predetermined torque value is exceeded, the at least one first ratchet slides over the at least one third ratchet.

In another embodiment, the first ratchet includes a first inclined surface and a first locking surface adjoined to the first inclined surface, and a first gradient of the first inclined surface relative to the first surface is smaller than a second gradient of the first locking surface relative to the first surface. The third ratchet includes a third inclined surface and a third locking surface adjoined to the third inclined surface, and a fifth gradient of the third inclined surface relative to the inner surface of the top cover is smaller than a sixth gradient of the third locking surface relative to the inner surface of the top cover. When the top cover is rotated counterclockwise, the first inclined surface of the first ratchet engages with the third inclined surface of the third ratchet such that the top cover may rotate counterclockwise relative to the torque element.

In another embodiment, the second ratchet includes a second inclined surface and a second locking surface adjoined to the second inclined surface, and a third gradient of the second inclined surface relative to a side surface of the annular wall is smaller than a fourth gradient of the second locking surface relative to the side surface of the annular wall. The fourth ratchet includes a fourth inclined surface and a fourth locking surface adjoined to the fourth inclined surface, and a seventh gradient of the fourth inclined surface relative to the inner wall of the main body is smaller than an eighth gradient of the fourth locking surface relative to the inner wall of the main body. When the top cover is rotated clockwise, the second inclined surface of the second ratchet engages with the fourth inclined surface such that the torque element may rotate clockwise relative to the main body.

In another embodiment, the base has an annular shape and the torque element further includes a first and second arms extending from the inner side surface of the base and an annular ring connected between the first arm and the second arm and coaxial with the base. The top cover includes a pole extending from the inner surface thereof and passing through the annular ring to position the torque element.

According to yet another aspect of the disclosure, a cap assembly is provided. The cap assembly comprises a torque element, a top cover and a main body. The torque element includes a base having a first surface and a second surface opposite to the first surface and an annular wall. The first surface of the base includes at least one first ratchet. The annular wall extends from the base and away from the second surface, and an outer side surface of the annular wall includes at least one second ratchet. The top cover includes an outer surface and an inner surface opposite to the outer surface, and the inner surface of the top cover includes at least one third ratchet cooperated with the first ratchet of the torque element. The main body includes a cylinder portion, an inner wall of the cylinder portion includes at least one fourth ratchet cooperated with the second ratchet of the torque element. The torque element is positioned in the cylinder portion, and the first surface of the torque element is adjacent to the inner surface of the top cover. The first ratchet and the third ratchet are configured such that the top cover may rotate counterclockwise relative to the torque element and generate a click sound when the third ratchet slides over the first ratchet. The second ratchet and the fourth ratchet are configured such that the torque element may rotate clockwise relative to the main body and generate a click sound when the second ratchet slides over the fourth ratchet.

In one embodiment, the first inclined surface and the second inclined surface face toward a counterclockwise rotation direction.

In another embodiment, the first ratchet includes a first inclined surface and a first locking surface adjoined to the first inclined surface, and a first gradient of the first inclined surface relative to the first surface is smaller than a second gradient of the first locking surface relative to the first surface. The third ratchet includes a third inclined surface and a third locking surface adjoined to the third inclined surface, and a fifth gradient of the third inclined surface relative to the inner surface of the top cover is smaller than a sixth gradient of the third locking surface relative to the inner surface of the top cover.

In another embodiment, the second ratchet includes a second inclined surface and a second locking surface adjoined to the second inclined surface, and a third gradient of the second inclined surface relative to a side surface of the annular wall is smaller than a fourth gradient of the second locking surface relative to the side surface of the annular wall. The fourth ratchet includes a fourth inclined surface and a fourth locking surface adjoined to the fourth inclined surface, and a seventh gradient of the fourth inclined surface relative to the inner wall of the main body is smaller than an eighth gradient of the fourth locking surface relative to the inner wall of the main body.

In another embodiment, the number of the second ratchet is greater than that of the first ratchet.

One or more advantageous features as described herein are believed to be readily apparent from the following detailed description of one or more embodiments when taken in connection with the accompanying drawings.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1:
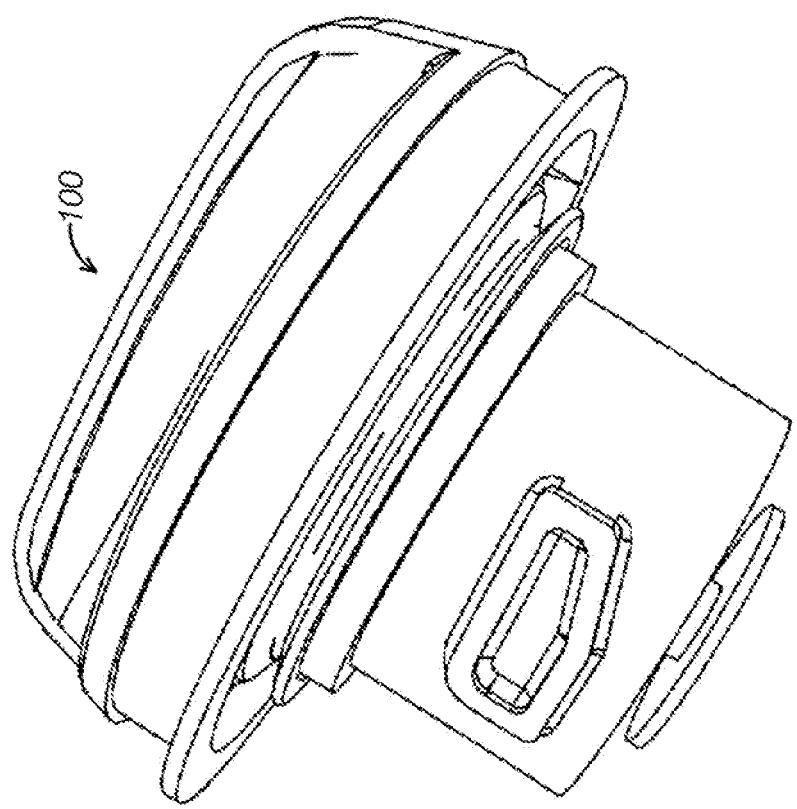
FIG. 1 depicts a perspective view of a cap assembly and a filler neck according to one or more embodiments of the present disclosure.
Figure 1:
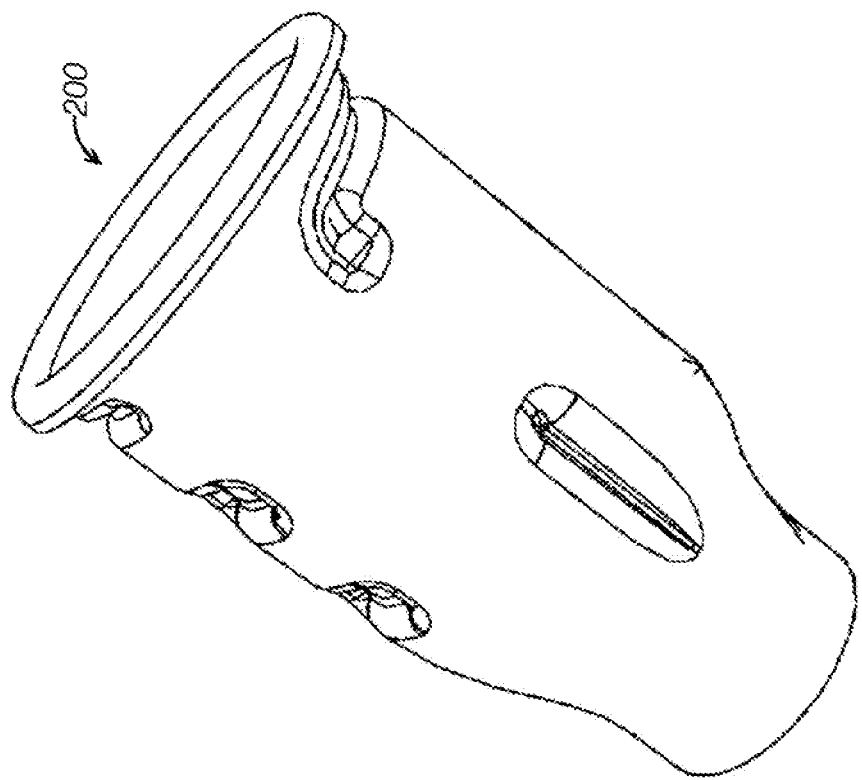

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

As referenced in the figures, the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

FIG. 1 shows a perspective view of a cap assembly 100 and an opening portion 200 of a container according to one or more embodiments of the present disclosure. The cap assembly 100 is used to seal the container opening portion 200. The container may be used to store any suitable substance. In one or more embodiments, the container may be a fuel tank of a vehicle, and the container opening portion 200 may be a fuel filler neck of the fuel tank. The cap assembly 100 can be inserted into the opening portion 200 and rotated clockwise to be tightened, i.e. the cap assembly 100 is locked. The cap assembly 100 is rotated counterclockwise to be released, i.e. the cap assembly 100 is unlocked. In one or more embodiments, the cap assembly 100 may be rotated by a half turn or less than a half turn to be tightened or released.

Figure 2:
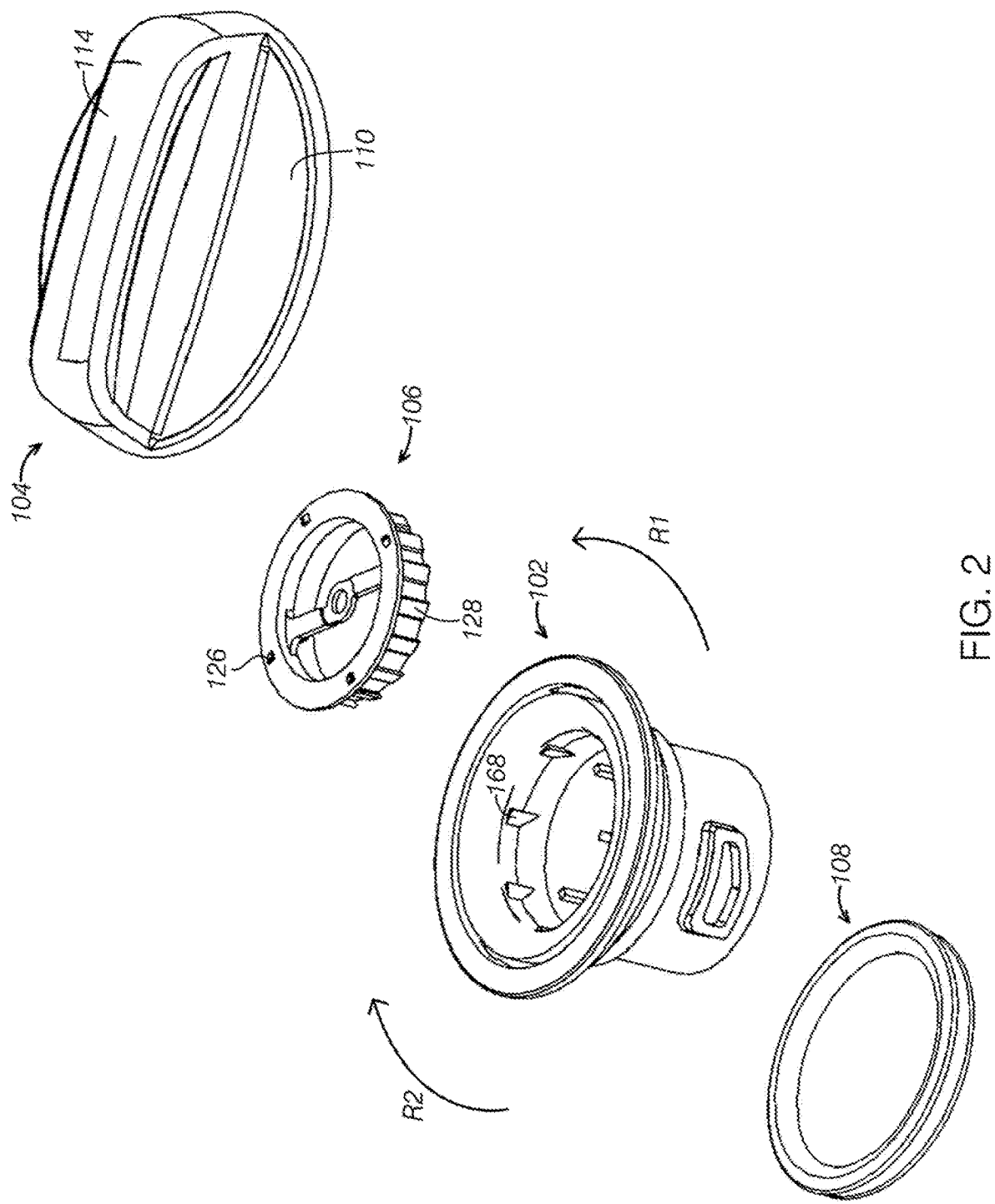
FIG. 2 depicts an exploded view of the cap assembly in FIG. 2.

Referring to FIG. 2, it depicts an exploded view of the cap assembly 100 in FIG. 1. In one or more embodiments, the cap assembly 100 includes a main body 102, a top cover 104 mounted on the main body 102 and a torque element 106 positioned between the main body 102 and the top cover 104 to transmit torque there-between. As can be seen in FIG. 2, the torque element 106 may include a first ratchet 126 and a second ratchet 128. The main body 102 may include a fourth ratchet 168. Further, in one or more embodiments, the cap assembly 100 includes a seal ring 108 positioned on the main body 102 to seal an opening portion 200 of the container.

Figure 3:
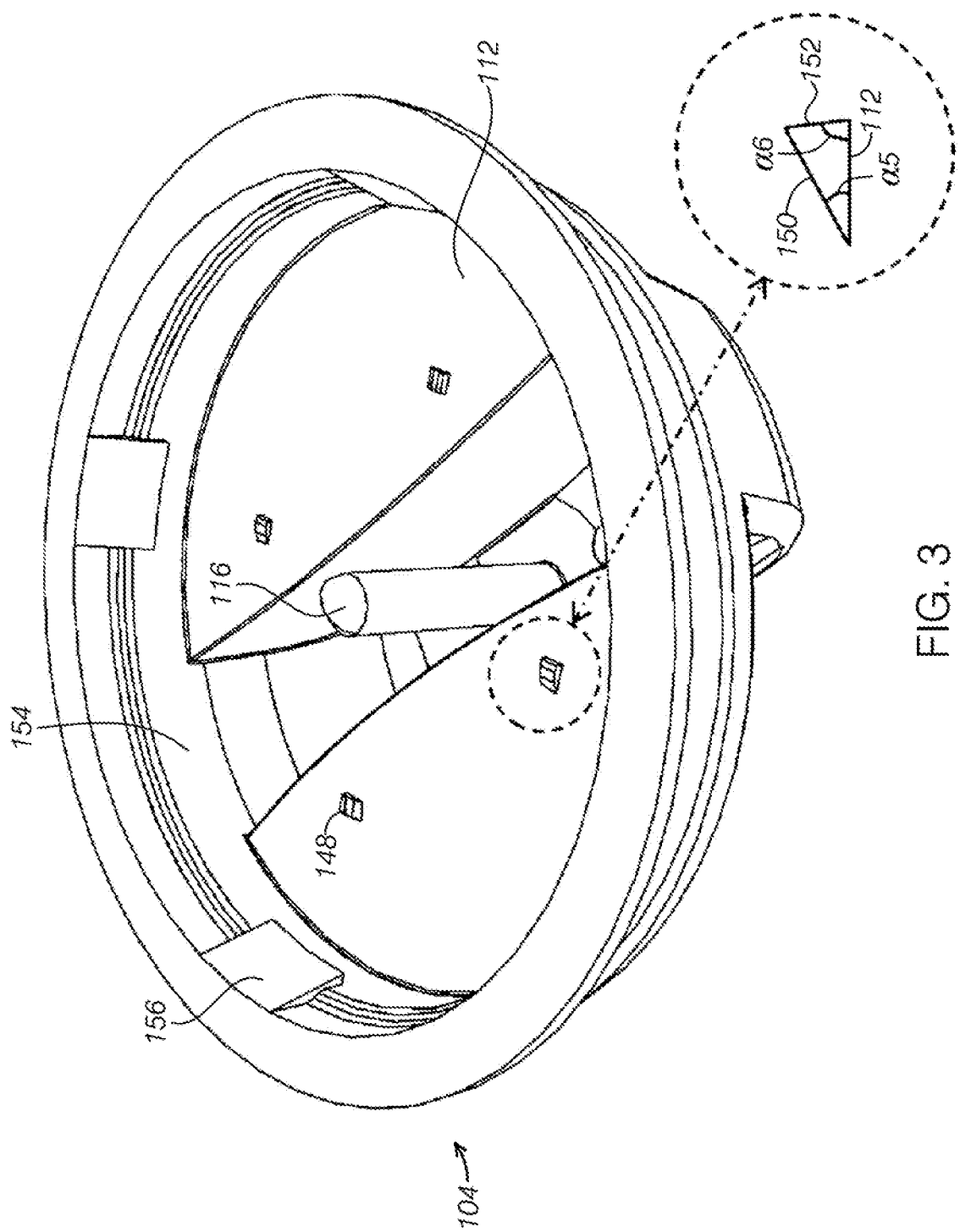
FIG. 3 depicts an enlarged view of a top cover of the cap assembly in FIG. 2.

Referring to FIG. 2 and FIG. 3, FIG. 3 depicts an enlarged view of the top cover 104 in FIG. 2 from another view angle. The top cover 104 includes an outer surface 110 and an inner surface 112 opposite to the outer surface 110. The inner surface 112 includes at least one ratchet 148. The top cover 104 includes a handle 114 extending from the outer surface 110 and a pole 116 extending from the inner surface 112.

Figure 4B:
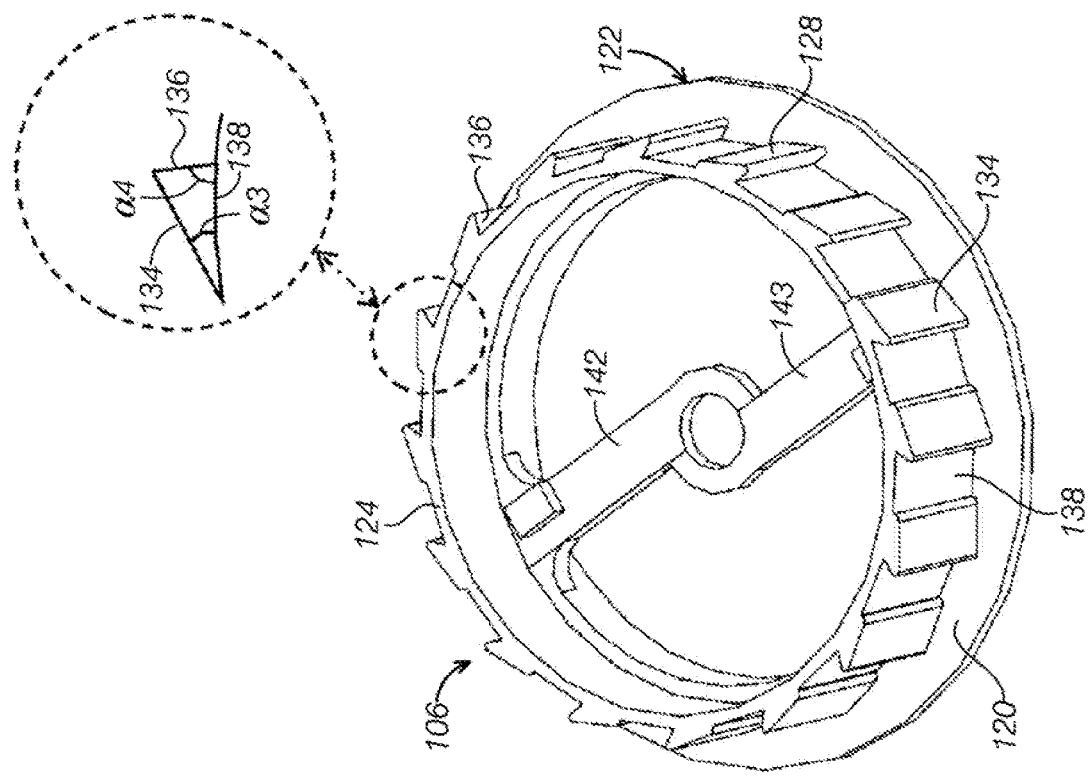
FIG. 4B depicts another view of the torque element of the cap assembly in FIG. 2.
Figure 4A:
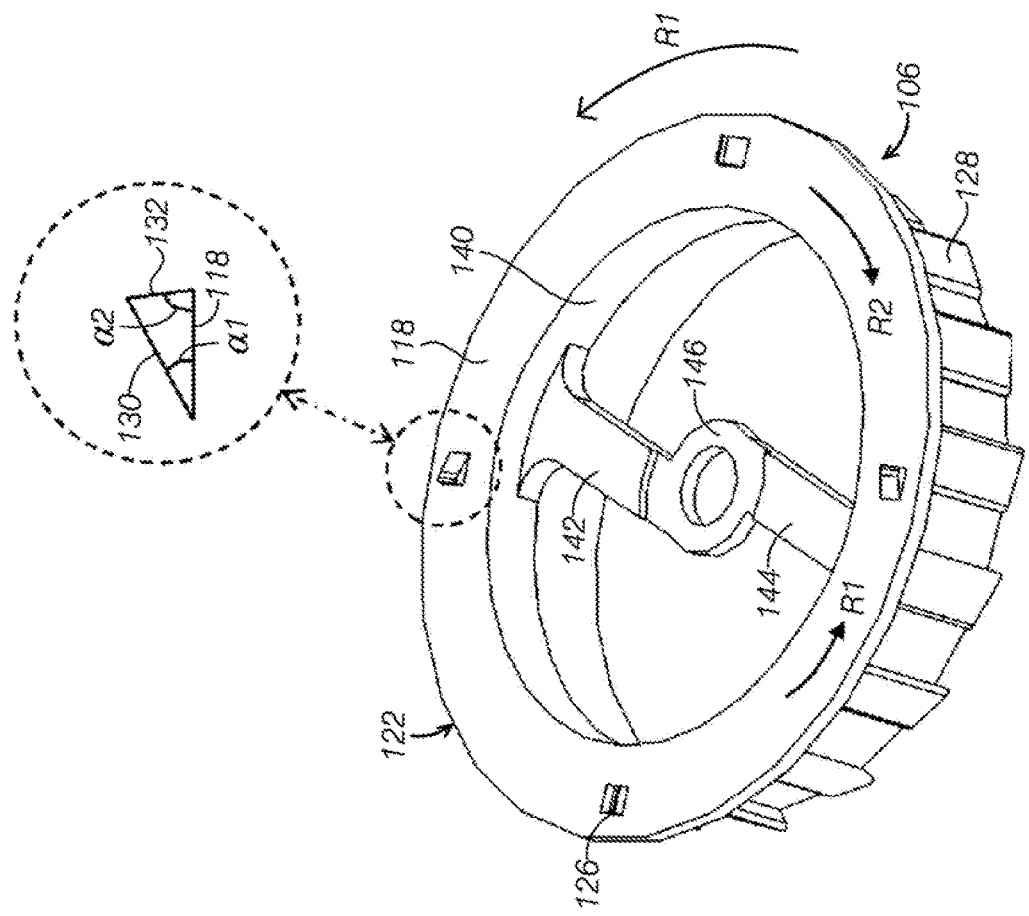
FIG. 4A depicts an enlarged view of a torque element of the cap assembly in FIG. 2.

Further referring to FIGS. 4A and 4B, FIG. 4A depicts an enlarged view of the torque element 106 in FIG. 2. FIG. 4B depicts another view of the torque element 106 in FIG. 4A. In one or more embodiments, the torque element 106 includes a base 122 having a first surface 118 and a second surface 120 opposite to the first surface 118, and an annular wall 124 extending from the base 122 and away from the second surface 120. In one or more embodiments, the first surface 118 of the base 122 includes at least one first ratchet 126, and the annular wall 124 includes at least one second ratchet 128 at an outer side thereof. The first ratchet 126 and a third ratchet 148 on the top cover 104 form a ratchet wheel. The second ratchet 128 and a fourth ratchet 168 on the main body 102 form another ratchet wheel. In the depicted embodiment, the first surface 118 of the base 122 has four first ratchets 126 spaced apart and the annular wall 124 of the base 122 has multiple second ratchets 128 or more second ratchets than the first ratchets in the number. It should be appreciated that the number of the first ratchets and the second ratchets may be increased or reduced as needed. For instance, the intervals of the ratchets are configured such that interaction between ratchets of the ratchet wheel may generate a click sound to alert a user that the cap assembly 100 has been tightened or released based on a degree of rotation required to tighten or release the cap assembly 100.

In one or more embodiments, the annular wall 124 is substantially perpendicular to the second surface 120. The term "substantially perpendicular" means an angle within 90 degrees plus or minus 5 degrees. However, it should be understood that the annular wall 124 may not be perpendicular to the second surface, as long as their cross-section are coaxial circles. That is, the annular wall may have a truncated cone shape. In one or more embodiments, the base 122 and the annular wall 124 may be integrally formed as one piece, that is, the torque element 106 may be an integrally formed part, which reduces the number of parts and assembling time. Alternatively, the annular wall 124 may be connected to the base 122 by any suitable methods, including but not limited to welding, bonding or a fastener.

Referring to FIG. 4A, the first ratchet 126 includes a first inclined surface 130 and a first locking surface 132 adjoined to the first inclined surface 130. A first gradient of the first inclined surface 130 relative to the first surface 118 is smaller than a second gradient of the first locking surface 132 relative to the first surface 118. In other words, an angle $\alpha 1$ between the first inclined surface 130 and the first surface 118 is smaller than an angle $\alpha 2$ between first locking surface 132 and the first surface 118. The second ratchet 128 includes a second inclined surface 134 and a second locking surface 136 adjoined to the second inclined surface 134. A third gradient of the second inclined surface 134 relative to a side surface 138 of the annular wall 124 is smaller than a fourth gradient of the second locking surface 136 relative to the side surface 138 of the annular wall 124. In other words, an angle $\alpha 3$ between the second inclined surface 134 and the side surface 138 of the annular wall 124 is smaller than an angle $\alpha 4$ between the second locking surface 136 and the side surface 138 of the annular wall 124. The first inclined surface 130 and the second inclined surface 134 face toward a counterclockwise rotation direction R1. In one or more embodiments, the base 122 is annular shape and the torque element 106 further includes a first and second arms 142, 144 extending from the inner side surface 140 of the base 122 and an annular ring 146 at a center between the first arm 142 and the second arm 144 and coaxial with the base 122. The top cover 104 includes a pole 116 extending from the inner surface 112 thereof and through the annular ring 146 to position the torque element 106.

Now, referring to FIG. 3, the inner surface 112 of the top cover 104 includes at least one third ratchet 148 cooperated with the first ratchet 126. The first ratchet 126 and the third ratchet 148 form a first ratchet wheel. In one or more embodiments, the number of the first ratchet 126 may be equal to the number of the third ratchet 148. However, the number of the first ratchet 126 may be greater or smaller than the number of the third ratchet 148 as needed. It should be understood that the number of the first ratchet 126 and the number of third ratchet 148 may determine a degree that the top cover 104 may freely rotate relative to the torque element 106. The more the number of the first ratchet 126 and the number of the third ratchet 148, the less the degree that the top cover 104 may freely rotate relative to the torque element 106. The at least one first ratchet 126 and the at least one third ratchet 148 are configured such that the top cover 104 drives the torque element 106 to rotate counterclockwise, and the top cover 104 may rotate counterclockwise relative to the torque element 106. In one or more embodiments, the third ratchet 148 includes a third inclined surface 150 and a third locking surface 152 adjoined to the third inclined surface 150, and a fifth gradient of the third inclined surface 150 relative to the inner surface 112 of the top cover 104 is smaller than a sixth gradient of the third locking surface 152 relative to the inner surface 112 of the top cover 104. In other words, an angle $\alpha 5$ between the third inclined surface 150 and the inner surface 112 of the top cover 104 is smaller than an angle $\alpha 6$ between the third locking surface 152 and the inner surface 112 of the top cover 104. With further reference to FIGS. 2. And 4A, when the top cover 104 is rotated counterclockwise, the first inclined surface 130 of the first ratchet 126 engages with the third inclined surface 150 of the third ratchet 148 such that the top cover 104 may rotate counterclockwise relative to the torque element 106. That is, the first inclined surface 130 of the first ratchet 126 may slide over the third inclined surface 150 of the third ratchet 148 such that the top cover 104 may rotate counterclockwise relative to the torque element 106. The first ratchet 126 slides over the third ratchet 148 to generate a click sound. When the top cover 104 is rotated in a clockwise direction R2, the first locking surface 132 of the first ratchet 126 contacts the third locking surface 152 of the third ratchet 148 such that the top cover 104 cannot be able to rotate relative to the torque element 106.

In one or more embodiments, the inner side wall 154 of the top cover 104 may include a plurality of locking arm 156 in a circumferential direction.

Figure 5B:
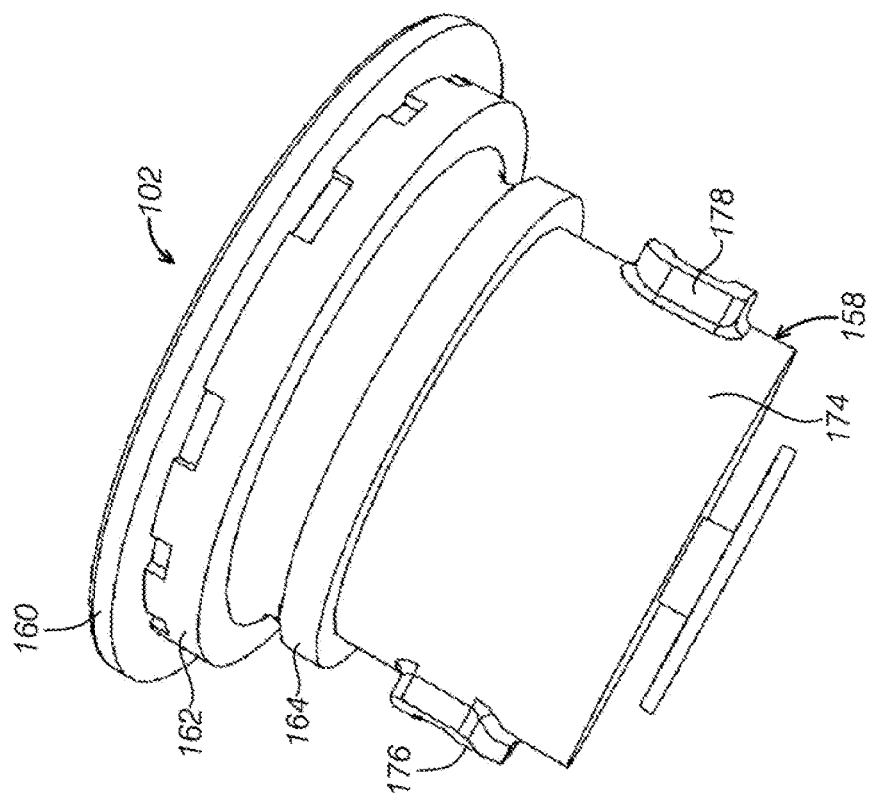
FIG. 5B depicts another view of the main body of the cap assembly in FIG. 2.
Figure 5A:
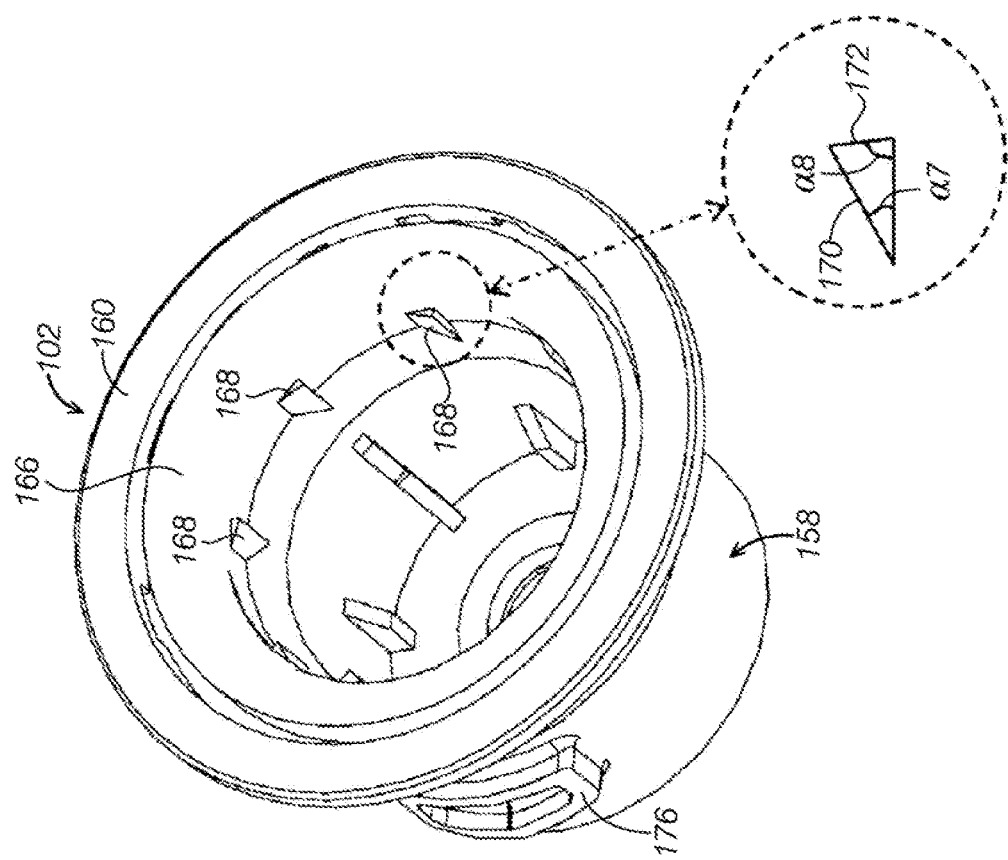
FIG. 5A depicts an enlarged view of a main body of the cap assembly in FIG. 2.

Referring to FIGS. 5A and 5B, FIG. 5A depicts an enlarged view of the main body 102. FIG. 5B depicts another view of the main body 102 from different view angle. The main body 102 includes a cylinder portion 158, a flange portion 160 extending from the cylinder portion 158 in a radial direction, and first and second ribs 162, 164 extending from the cylinder portion 158 in a radial direction and spaced apart from each other. In one or more embodiments, the first rib 162 adjacent to the flange portion 160 to enhance the overall strength. The sealing ring 108 as shown in the FIG. 2 is positioned between the first rib 162 and the second rib 164 to form a seal between the cap assembly 100 and the opening of the container. In one or more embodiments, an inner wall 166 of the cylinder portion 158 has at least one fourth ratchet 168 to cooperate with the second ratchet 128 of the torque element 106. The second ratchet 128 of the torque 106 and the fourth ratchet 168 of the main body 102 form a second ratchet wheel. The second ratchet wheel is configured such that when the top cover 104 rotates clockwise a certain degree, a contact between one of a plurality of the second ratchets 128 and one of a plurality of the fourth ratchets 168 enables the torque element 106 to rotate clockwise relative to the main body 102 and generates a click sound. In the depicted embodiment, the number of the second ratchets 128 is greater than the number of the fourth ratchets 168. In one or more embodiments, the fourth ratchet 168 includes a fourth inclined surface 170 and a fourth locking surface 172 adjoined to the fourth inclined surface 170, and a seventh gradient of the fourth inclined surface 170 relative to the inner wall 166 of the main body 102 is smaller than an eighth gradient of the fourth locking surface 172 relative to the inner wall 166 of the main body 102. In other words, an angle α7 defined between the fourth inclined surface 170 and the inner wall 166 of the main body 102 is smaller than an angle α8 defined between the fourth locking surface 172 and the inner wall 166 of the main body 102. The at least one second ratchet 128 and the at least one fourth ratchet 268 are configured such that the top cover 104 drives the torque element 106 to rotated in a clockwise direction R2, and the torque element 106 may rotate in a clockwise direction R2 relative to the main body 102. That is, the second inclined surface 134 of the second ratchet 128 may slide over the fourth inclined surface 170 of the fourth ratchet 168 such that the torque element 106 may rotate clockwise relative to the main body 102. The second ratchet 128 slides over the fourth ratchet 168 to generate a click sound. When the top cover 104 is rotated in a counterclockwise direction R1, the second locking surface 136 of the second ratchet 128 contacts the fourth locking surface 172 of the fourth ratchet 168 such that the torque element 106 cannot rotate relative to the main body 102.

Further, the main body 102 includes a pair of first stop 176 and second stop 178 positioned on the outer wall 174 of the cylinder portion 158 and opposite to each other.

In one or more embodiments, the angle α1, α3, α5, α7 may be about the same and about 30 degrees, the angle α2, α4, α6, α8 may be about the same and about 90 degrees. It should be understood that in one or more embodiments, the angle α1, α3, α5, α7 may be or not be the same, and for instance including but not limited to a range between 30 degrees and 45 degrees. The angle α2, α4, α6, α8 may be or not be the same, and for instance including but not limited to a range between 60 degrees and 120 degrees.

In one or more embodiments, the torque element 106 is disposed in the cylinder portion 158 of the main body 102, and the side surface 138 of the annular wall 124 of the torque element 106 or the second ratchet 128 is adjacent to the inner wall 166 of the cylinder portion 158 of the main body 102 such that at least one the second ratchet 128 may cooperate with the fourth ratchet 168 during rotation. The top cover 104 may be rotationally coupled to the main body 102 via a cooperation between the locking arms 156 (see FIG. 3) and the flange portion 160. The first surface 118 of the base 122 of the torque element 106 or the first ratchet 126 is adjacent to the inner surface 112 of the top cover 104 such that at least one the first ratchet 126 may cooperate with the third ratchet 148 during rotation.

Figure 6B:
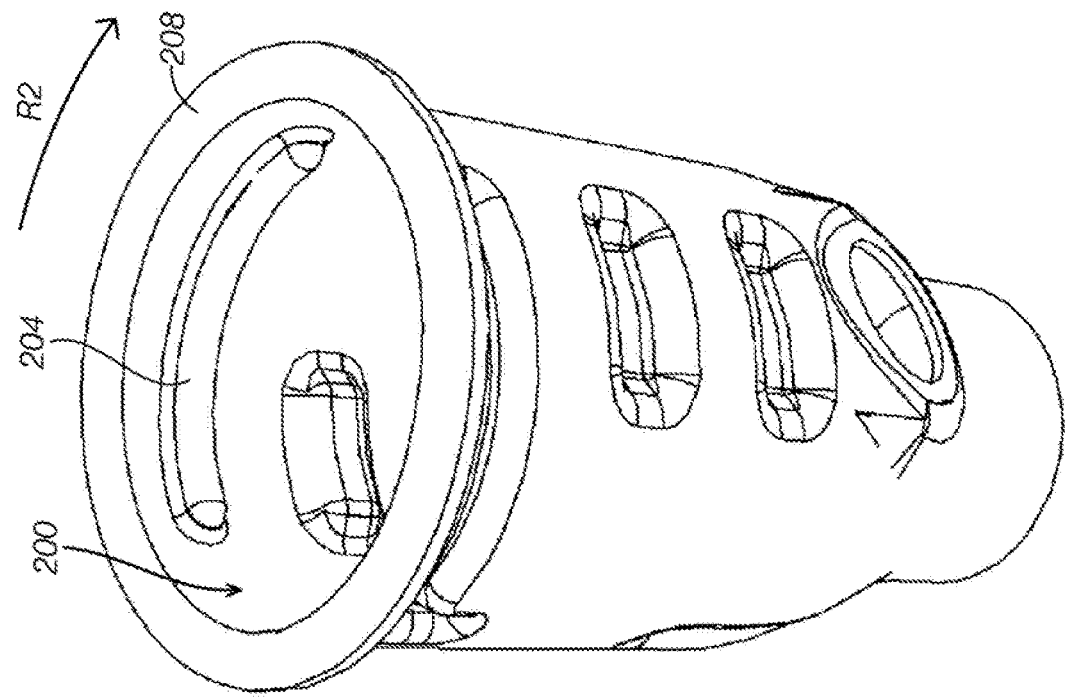
FIG. 6B depicts another enlarged view of the container opening in FIG. 1.
Figure 6A:
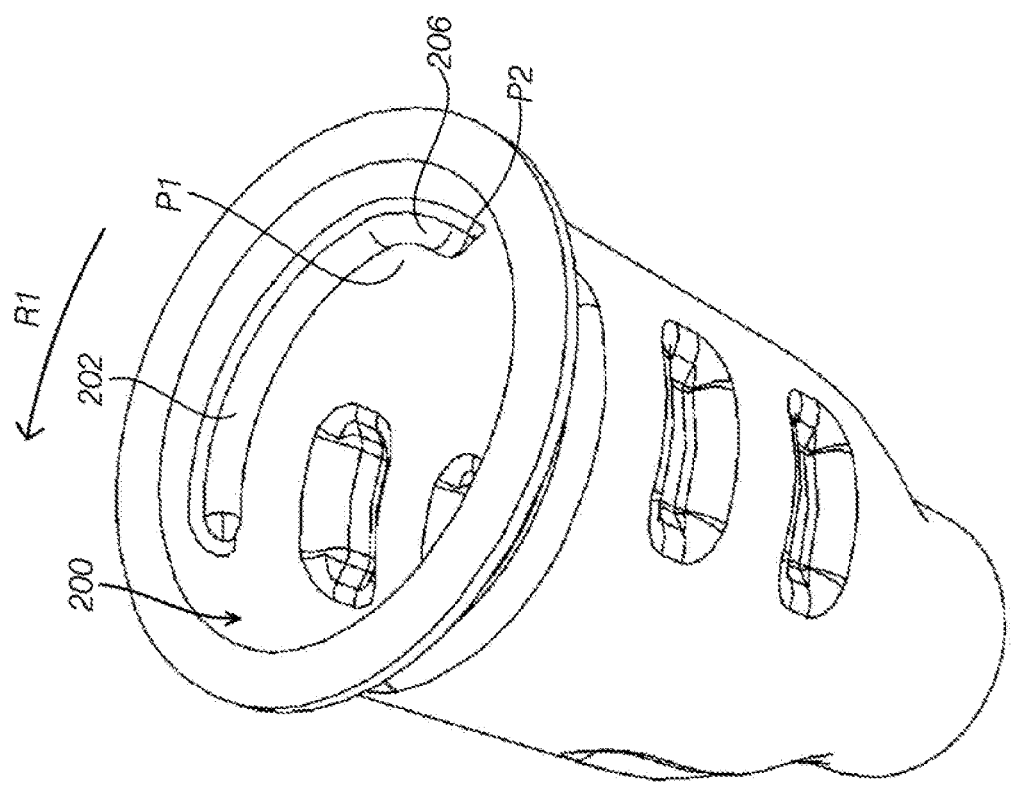
FIG. 6A depicts an enlarged view of the container opening in FIG. 1.

Further referring to FIGS. 6A and 6B, FIG. 6A depicts an enlarged view of an opening portion 200 of a container in FIG. 1. FIG. 6B depicts another enlarged view of the opening portion 200 of the container. In one or more embodiments, the opening portion 200 includes a pair of first bar 202 and second bar 204 projecting radially and opposite to each other. The first and second bars 202, 204 extend along a circumference and inclined relative to a top surface 208 to guide the first stop 176 and the second stop 178 positioned on the main body 102 of the cap assembly 100 such that the main body 102 moves inside the opening portion 200. The first bar 202 has a bending portion 206. When the first stop 176 of the main body 102 rotates in a clockwise direction R2 and contacts the bending portion 206, the cap assembly 100 is in a locked position P1. However, it should be understood that in one or more embodiments, the stop 176 of the main body 102 may come to the locked position P1 before it contacts the bending portion 206 while rotating in a clockwise direction R2 based on design requirement. Further, when the second stop 178 of the main body 102 rotates in a counterclockwise direction R1 and contacts the bending portion 206, the cap assembly 100 is in an unlocked position P2.

In operation, when the top cover 104 is rotated in a clockwise direction R2, for example via the handle 114, the first ratchet 126 cooperates with the third ratchet 148. Specifically, the third locking surface 152 of the third ratchet 148 cooperates with the first locking surface 132 of the first ratchet 126 such that the torque applied onto the top cover 104 may be transmitted to the torque element 106 via friction action. Further, the second ratchet 128 cooperated with the fourth ratchet 168. Specifically, the second inclined surface 134 of the second ratchet 128 cooperates with the fourth inclined surface 170 of the fourth ratchet 168 such that the torque applied onto the torque element 106 may be transmitted to the main body 102. When the main body 102 is rotated to a locked position P1 or after the locked position P1, and a first predetermined torque value (for overcoming the friction force between the second inclined surface 134 and the fourth inclined surface 170) is exceeded, at least one second ratchet 128 slides over the at least one fourth ratchet 168, specifically, the second inclined surface 134 of the second ratchet 128 slides over the fourth inclined surface 170 of the fourth ratchet 168. The at least one second ratchet 128 slides over the at least one fourth ratchet 168 to generate a click sound to alert a user that the cap assembly 100 has been tightened and thus prevent damage resulted from overtightening.

When the top cover 104 is rotated in the counterclockwise direction R1, the first ratchet 126 cooperates with the third ratchet 148. Specifically, the friction between the third inclined surface 150 of the third ratchet 148 and the first inclined surface 130 of the first ratchet 126 enables the torque applied onto the top cover 104 to be transmitted to the torque element 106. Further, the second ratchet 128 cooperates with the fourth ratchet 168, Specifically, the second locking surface 136 of the second ratchet 128 cooperates with the fourth locking surface 172 of the fourth ratchet 168 such that the torque applied onto the torque element 106 may be transmitted to the main body 102. When the main body 102 is rotated to an unlocked position P2 or after the unlocked position, and the second predetermined torque value (for overcoming the friction force between the first inclined surface 130 and the fifth inclined surface 150) is exceeded, at least one first ratchet 126 slides over the at least one third ratchet 148. Specifically, the first inclined surface 130 of the first ratchet 126 slides over the third inclined surface 150 of the third ratchet 148. The at least one first ratchet 126 slides over the at least one third ratchet 148 to generate a click sound to alert a user that the cap assembly 100 has been released and thus prevent the damage resulting from further turning by the user.

In one or more embodiments, the number of the second ratchet 128 is greater than the number of the first ratchet 126. Such configuration is advantageous to provide different click frequency when tighten or release the cap assembly 100 so that the user can distinguish a tightening or releasing action. Further, in one or more embodiments, the number of the fourth ratchet 168 may be greater than the number of the third ratchet 148 to further enhance the above effect.

The torque element or cap assembly of the present disclosure not only transmits a torque between the top cover 104 and the torque element 106, but also generate a click sound when releasing the cap assembly 100 to alert the user to prevent from further turning the cap assembly. Further, a second ratchet wheel (i.e., the second ratchet 128 and the fourth ratchet 168) not only transmit torque between the top cover 104 and the main body 102, but also generate a click sound when tightening the cap assembly 100 to alert the user to prevent the user from further turning the cap assembly.

While the present invention has been disclosed in a particular form, the specific embodiments disclosed and illustrated above are not to be considered in a limiting sense as numerous variations are possible. The subject matter of the inventions includes all novel and non-obvious combinations and sub-combinations of the various elements, features, functions and/or properties disclosed above and inherent to those skilled in the art pertaining to such inventions. Those skilled in the art will understand that the disclosed examples may be varied, modified, and altered without departing from the scope of the inventions described herein.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A torque element to transmit a torque between a first part and a second part in a cap assembly, comprising:
a base having a first surface and a second surface opposite to the first surface; and
an annular wall extending from the base in a direction away from the second surface;
wherein the first surface of the base includes at least one first ratchet and the annular wall includes at least one second ratchet on an outer side thereof; and
wherein the second ratchet includes a second inclined surface and a second locking surface adjoined to the second inclined surface, and a third gradient of the second inclined surface relative to a side surface of the annular wall is smaller than a fourth gradient of the second locking surface relative to the side surface of the annular wall.

2. The torque element of the claim 1, wherein the annular wall is substantially perpendicular to the second surface of the base.

3. The torque element of the claim 1, wherein the base and the annular wall are integrally formed as one piece.

4. The torque element of the claim 1, wherein the first ratchet includes a first inclined surface and a first locking surface adjoined to the first inclined surface, and a first gradient of the first inclined surface relative to the first surface is smaller than a second gradient of the first locking surface relative to the first surface.

5. The torque element of the claim 4, wherein the first inclined surface and the second inclined surface face toward a counterclockwise rotation direction.

6. A cap assembly, comprising:
a main body;
a top cover mounted to the main body and having an outer surface and an inner surface opposite to the outer surface; and
a torque element positioned between the main body and the top cover to transmit torque there-between; wherein the torque element including:
a base having a first surface and a second surface opposite to the first surface; and
an annular wall extending from the base in a direction away from the second surface;
wherein the first surface of the base includes at least one first ratchet, and the inner surface of the top cover includes at least one third ratchet cooperated with the first ratchet.

7. The cap assembly of the claim 6, wherein an outer side of the annular wall of the torque element includes at least one second ratchet, the annular wall is adjacent to an inner wall of the main body, and the inner wall of the main body includes at least one fourth ratchet cooperated with the second ratchet.

8. The cap assembly of the claim 7, wherein the at least one second ratchet and the at least one fourth ratchet are configured such that the top cover drives the torque element to rotate clockwise, and the torque element is able to rotate clockwise relative to the main body.

9. The cap assembly of the claim 8, wherein when the main body rotates to a locked position or after the locked position and a first predetermined torque value is exceeded, the at least one second ratchet slides over the at least one fourth ratchet.

10. The cap assembly of the claim 9, wherein the at least one first ratchet and the at least one third ratchet are configured such that the top cover drives the torque element to rotate counterclockwise, and the top cover may rotate counterclockwise relative to the torque element.

11. The cap assembly of the claim 10, wherein when the main body rotates to an unlocked position or after the unlocked position and a second predetermined torque value is exceeded, the at least one first ratchet slides over the at least one third ratchet.

12. The cap assembly of the claim 11, wherein the first ratchet includes a first inclined surface and a first locking surface adjoined to the first inclined surface, and a first gradient of the first inclined surface relative to the first surface is smaller than a second gradient of the first locking surface relative to the first surface; wherein the third ratchet includes a third inclined surface and a third locking surface adjoined to the third inclined surface, and a fifth gradient of the third inclined surface relative to the inner surface of the top cover is smaller than a sixth gradient of the third locking surface relative to the inner surface of the top cover;

wherein, when the top cover is rotated counterclockwise, the first inclined surface of the first ratchet engages with the third inclined surface of the third ratchet such that the top cover is able to rotate counterclockwise relative to the torque element.

13. The cap assembly of the claim 12, wherein the second ratchet includes a second inclined surface and a second locking surface adjoined to the second inclined surface, and a third gradient of the second inclined surface relative to a side surface of the annular wall is smaller than a fourth gradient of the second locking surface relative to the side surface of the annular wall; wherein the fourth ratchet includes a fourth inclined surface and a fourth locking surface adjoined to the fourth inclined surface, and a seventh gradient of the fourth inclined surface relative to the inner wall of the main body is smaller than an eighth gradient of the fourth locking surface relative to the inner wall of the main body; and wherein, when the top cover is rotated clockwise, the second inclined surface of the second ratchet engages with the fourth inclined surface such that the torque element is able to rotate clockwise relative to the main body.

14. The cap assembly of the claim 6, wherein the base has an annular shape and the torque element further includes a first and second arms extending from an inner surface of the annular wall and an annular ring connected between the first arm and the second arm and coaxial with the base; and wherein the top cover includes a pole extending from the inner surface thereof and passing through the annular ring to position the torque element.

15. A cap assembly, comprising:
a torque element including a base having a first surface and a second surface opposite to the first surface, wherein the first surface includes at least one first ratchet; and an annular wall extends from the base and away from the second surface, an outer side surface of the annular wall includes at least one second ratchet;
a top cover having an outer surface and an inner surface opposite to the outer surface, wherein the inner surface of the top cover includes at least one third ratchet cooperated with the first ratchet of the torque element; and
a main body having a cylinder portion, wherein an inner wall of the cylinder portion includes at least one fourth ratchet cooperated with the second ratchet of the torque element;

wherein the torque element is positioned in the cylinder portion of the main body, the first surface of the torque element is adjacent to the inner surface of the top cover; the first ratchet and the third ratchet are configured such that the top cover may rotate counterclockwise relative to the torque element and generate a click sound when the third ratchet slides over the first ratchet; and the second ratchet and the fourth ratchet are configured such that the torque element may rotate clockwise relative to the main body and generate a click sound when the second ratchet slides over the fourth ratchet.

16. The cap assembly of the claim 15, wherein the first ratchet includes a first inclined surface and a first locking surface adjoined to the first inclined surface, and the second ratchet includes a second inclined surface and a second locking surface adjoined to the second inclined surface, and wherein the first inclined surface and the second inclined surface face toward a counterclockwise rotation direction.

17. The cap assembly of the claim 16, wherein a first gradient of the first inclined surface relative to the first surface is smaller than a second gradient of the first locking surface relative to the first surface; and wherein the third ratchet includes a third inclined surface and a third locking surface adjoined to the third inclined surface, and a fifth gradient of the third inclined surface relative to the inner surface of the top cover is smaller than a sixth gradient of the third locking surface relative to the inner surface of the top cover.

18. The cap assembly of the claim 17, wherein a third gradient of the second inclined surface relative to a side surface of the annular wall is smaller than a fourth gradient of the second locking surface relative to the side surface of the annular wall; and wherein the fourth ratchet includes a fourth inclined surface and a fourth locking surface adjoined to the fourth inclined surface, and a seventh gradient of the fourth inclined surface relative to the inner wall of the main body is smaller than an eighth gradient of the fourth locking surface relative to the inner wall of the main body.

19. The cap assembly of the claim 18, wherein a number of the second ratchet is greater than that of the first ratchet.

\* \* \* \* \*